(12) United States Patent
DeFilippis (10) Patent No.: US 8,731,127 B2
(45) Date of Patent: May 20, 2014

(54) METHOD AND APPARATUS FOR A BWR INLET MIXER CLAMP ASSEMBLY

(75) Inventor: Michael S. DeFilippis, Wilmington, NC (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 1006 days.

(21) Appl. No.: 12/849,923

(22) Filed: Aug. 4, 2010

(65) Prior Publication Data

US 2012/0033781 A1 Feb. 9, 2012

(51) Int. Cl.
*G21D 1/02* (2006.01)
*G21C 15/25* (2006.01)

(52) U.S. Cl.
USPC ............ 376/260; 376/372; 376/392; 376/407

(58) Field of Classification Search
USPC .......................................... 376/372, 392, 407
See application file for complete search history.

(56) References Cited

U.S. PATENT DOCUMENTS

| | | | | |
|---|---|---|---|---|
| 3,385,545 | A | * | 5/1968 | Patton .......................... 248/68.1 |
| 3,389,735 | A | * | 6/1968 | Katz .............................. 411/120 |
| 5,515,407 | A | * | 5/1996 | Bevilacqua et al. .......... 376/372 |
| 5,978,433 | A | * | 11/1999 | Erbes et al. .................... 376/372 |
| 6,434,208 | B1 | * | 8/2002 | Erbes et al. .................... 376/260 |
| 6,609,343 | B1 | * | 8/2003 | Litten ........................... 52/653.2 |
| 7,272,204 | B2 | | 9/2007 | Jensen |
| 7,515,673 | B2 | * | 4/2009 | Jensen et al. .................. 376/303 |
| 7,596,200 | B2 | * | 9/2009 | Jensen ........................... 376/372 |
| 7,931,245 | B2 | * | 4/2011 | Mills et al. ............... 248/231.71 |
| 8,194,815 | B2 | | 6/2012 | Wroblewski et al. |
| 8,608,121 | B2 | | 12/2013 | Maehara et al. |
| 2001/0001009 | A1 | * | 5/2001 | Wivagg et al. ................. 376/407 |
| 2002/0030148 | A1 | * | 3/2002 | Oddsen, Jr. .................... 248/314 |
| 2008/0042027 | A1 | * | 2/2008 | LaScala .................... 248/229.15 |
| 2008/0251651 | A1 | * | 10/2008 | Jackson et al. ................... 248/62 |

(Continued)

FOREIGN PATENT DOCUMENTS

| | | |
|---|---|---|
| EP | 2 146 351 A1 * | 1/2010 |
| JP | 60-37898 * | 3/1985 |

(Continued)

OTHER PUBLICATIONS

USPTO Office Action for U.S. Appl. No. 12/839,948 dated Jun. 1, 2012.*

(Continued)

*Primary Examiner* — Jack W Keith
*Assistant Examiner* — Sean P Burke
(74) *Attorney, Agent, or Firm* — Harness, Dickey & Pierce, PLC (57) ABSTRACT

A method and apparatus for physically restraining an inlet mixer of a boiling water reactor (BWR) jet pump assembly. An inlet mixer clamp assembly is attached to the top of a transition piece of the BWR jet pump assembly, to provides a downward clamping force on the top of the inlet mixer. The clamping force restrains the inlet mixer from experiencing vibration and mitigates leakage between the inlet mixer and the transition piece sealing surfaces of the jet pump assembly. The clamping force also restrains the inlet mixer from undesirable rotation, especially during operation of the jet pump assembly. The inlet mixer clamp assembly may be used as an alternative to conventional jet pump beam assemblies. Alternatively, the inlet mixer clamp assembly may be used as a redundant physical restraint in addition to the conventional jet pump beam assemblies.

6 Claims, 6 Drawing Sheets

(56) References Cited

U.S. PATENT DOCUMENTS

| | | | |
|---|---|---|---|
| 2009/0078840 A1* | 3/2009 | Wolvin | 248/229.15 |
| 2010/0242279 A1* | 9/2010 | Sprague et al. | 29/888.021 |
| 2012/0018612 A1* | 1/2012 | DeFilippis | 248/670 |
| 2012/0032064 A1* | 2/2012 | Defilippis et al. | 248/675 |
| 2012/0033782 A1* | 2/2012 | DeFilippis et al. | 376/372 |
| 2012/0042027 A1* | 2/2012 | Abuan et al. | 709/206 |
| 2012/0049025 A1 | 3/2012 | Halverson et al. | |

FOREIGN PATENT DOCUMENTS

| | | | |
|---|---|---|---|
| JP | 62-91294 | * | 6/1987 |
| JP | 62-170887 | * | 7/1987 |
| JP | 04-357385 | * | 12/1992 |
| JP | 08-201566 | * | 8/1996 |
| JP | 09-053626 | * | 2/1997 |
| JP | 09-133781 | * | 5/1997 |
| JP | 10-282289 | * | 10/1998 |
| JP | 10-2822889 | * | 10/1998 |
| JP | 2000-193785 | * | 7/2000 |
| JP | 2001-187982 | * | 7/2001 |
| JP | 2002-148381 | * | 5/2002 |
| JP | 2002-243887 | * | 8/2002 |
| JP | 2003-161795 | * | 6/2003 |
| JP | 2003-287586 | | 10/2003 |
| JP | 2004-219102 | * | 8/2004 |
| JP | 2005-106162 | * | 4/2005 |
| JP | 2005-194835 | * | 7/2005 |
| JP | 2003-287586 | * | 10/2006 |
| JP | 2009-075077 | * | 4/2007 |
| JP | 2007-139597 | * | 6/2007 |
| JP | 2007-183119 | * | 7/2007 |
| JP | 2006-71638 | * | 9/2007 |
| JP | 2008-107345 | * | 5/2008 |
| JP | 2008-256586 | * | 10/2008 |
| JP | 2009-282025 | * | 12/2009 |
| JP | 2010-14674 | * | 1/2010 |
| JP | 2010-138476 | * | 6/2010 |
| JP | 2010-237207 | * | 10/2010 |
| JP | 2010-237212 | * | 10/2010 |
| JP | 2011-123064 | * | 6/2011 |
| JP | 2011-169315 | * | 9/2011 |

OTHER PUBLICATIONS

Dec. 11, 2013 Office Action per JPO/App. 2011-170152.*
Dec. 17, 2013 Notice of Allowance in corresponding Japanese Patent Application No. 2011-169170.*
Jan. 8, 2014 Office Action per JPO/App. 2011-171556.*
U.S. Office Action dated Jun. 1, 2012 for related U.S. Appl. No. 12/839,948.
U.S. Office Action dated Oct. 26, 2012 for related copending U.S. Appl. No. 12/850,218.
U.S. Office Action dated Nov. 25, 2011 for co-pending U.S. Appl. No. 12/850,218.
U.S. Office Action dated Jun. 14, 2013 for co-pending U.S. Appl. No. 12/851,942.
Search report by the Spanish Patent Office for Spanish Application 201131353, dated Oct. 18, 2013.
Publication report by the Spanish Patent Office for Spanish Application 201131353, dated Oct. 22, 2013.
Dec. 17, 2013 Notice of Allowance issued in corresponding Japanese Patent Application No. 2011-169170.
Dec. 17, 2013 Notice of Allowance issued in corresponding Japanese Patent Application No. 2011-169170 (with translation).
Jan. 8, 2014 Office Action Issued in corresponding Japanese Patent Application No. 2011-171556.
Japanese Office Action issued in Japanese Application No. 2011-170152 dated Dec. 11, 2013 (with translation).

* cited by examiner

METHOD AND APPARATUS FOR A BWR INLET MIXER CLAMP ASSEMBLY

BACKGROUND OF THE INVENTION

1. Field of the Invention

Example embodiments relate generally to nuclear reactors, and more particularly to a method and apparatus for a Boiling Water Reactor (BWR) inlet mixer clamp assembly that physically restrains and applies a downward force on an inlet mixer of a boiling water reactor (BWR) jet pump assembly. The inlet mixer main clamp assembly may be used as an alternative to conventional jet pump beam assemblies. Alternatively, the inlet mixer clamp assembly may be used as a redundant physical restraint in addition to conventional jet pump beam assemblies.

2. Related Art

A reactor pressure vessel (RPV) of a boiling water reactor (BWR) typically has a generally cylindrical shape and is closed at both ends (for example by a bottom head and a removable top head). A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus between the cylindrical reactor pressure vessel and the cylindrically shaped shroud.

In a BWR, hollow tubular jet pumps positioned within the shroud annulus provide the required reactor core water flow. The upper portion of the jet pump, known as the inlet mixer, is laterally positioned and supported against two opposing rigid contacts within jet pump restrainer brackets by a gravity actuated wedge.

Conventionally, the inlet mixer is held in place by jet pump beam assemblies at the top of the BWR jet pump assembly. The jet pump beam assemblies press down and provide a clamping force on the inlet mixer to mitigate movement, rotation and vibration of the inlet mixer and reduce potential leakage between the inlet mixer and the transition piece sealing surfaces of a jet pump assembly. Additionally, the jet pump beam assemblies mitigate the potential that the inlet mixer may be ejected from the diffusers of the jet pump assembly during operation of the jet pump assembly. Conventionally, jet pump beam assemblies are highly stressed, they are limited in their clamping force, and they are susceptible to stress corrosion cracking. Field failures of jet pump assemblies have previously caused significant plant downtime and expensive repair.

SUMMARY OF INVENTION

Example embodiments provide a method and an apparatus for providing vertical restraint of an inlet mixer of a BWR jet pump assembly to reduce leakage and vibration of the inlet mixer. Example embodiments provide a clamping force, preferably at locations off of the centerline of the transition seat, to resist inlet mixer rotation. The clamping force of example embodiments may exceed the force that may otherwise be applied by conventional jet pump beam assemblies to ensure that the inlet mixer stays seated against the transition piece. The clamping force of example embodiments may eliminate a single point of failure for stabilizing the inlet mixer, as the clamping force may be a redundant downward force on the inlet mixer that may be applied in addition to conventional jet pump beam assemblies. Alternatively, the clamping force of example embodiments may be used in lieu of conventional jet pump beam assemblies.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
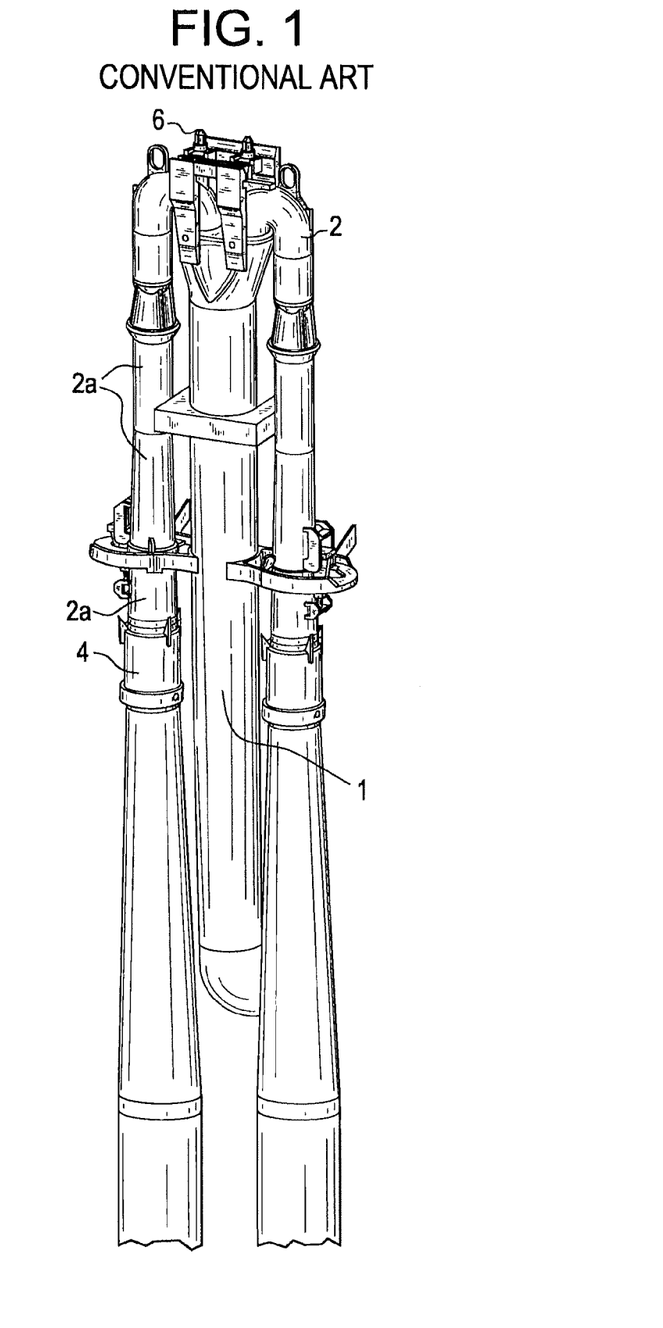
FIG. 1 is a perspective view of a conventional boiling water nuclear reactor (BWR) jet pump assembly.

FIG. 1 is a perspective view of a conventional boiling water nuclear reactor (BWR) jet pump assembly. The jet pump assembly includes a riser pipe 1 that brings water into inlet mixers 2. The inlet mixers discharge water into diffusers 4. The jet pump beam bolts 6 of the conventional jet pump beam assemblies (seen in better detail, in FIG. 2) can be seen toward the top of the inlet mixer 2.

Figure 2:
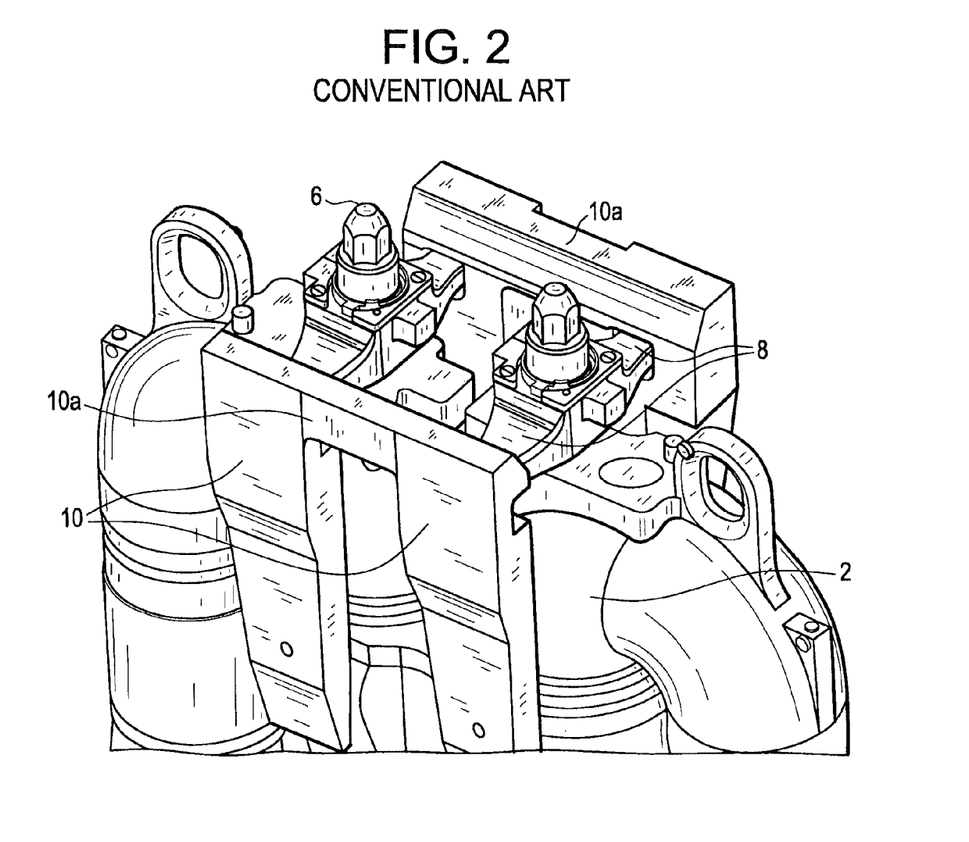
FIG. 2 is a detailed view of the top of an inlet mixer, with conventional jet pump beam assemblies in place.

FIG. 2 is a detailed view of the top of an inlet mixer 2, with conventional jet pump beam assemblies 8 in place. The jet pump beam assemblies 8 are attached underneath a bridge 10a portion of transition piece 10 of a conventional jet pump assembly. The transition piece 10 is welded to the top of the riser pipe 1 (see FIG. 1) to ensure stability of the transition piece 10. The jet pump beam assemblies provide a downward clamping force on the top of inlet mixer 2, to resist the vertical hydraulic load the inlet mixers see during operation and to reduce vibration of the inlet mixer.

Figure 3:
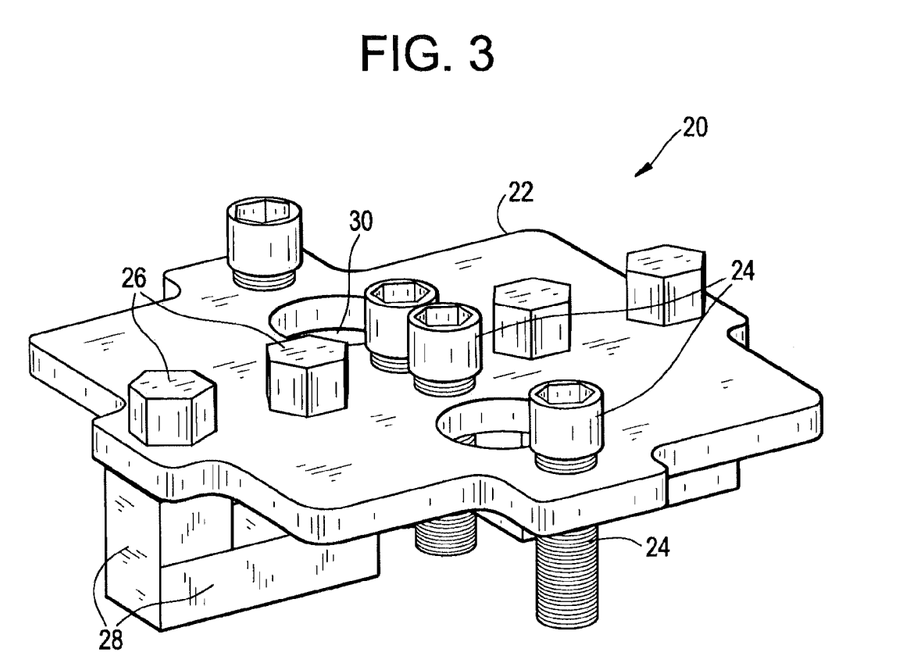
FIG. 3 is a detailed view of a BWR inlet mixer clamp assembly, in accordance with example embodiments.

FIG. 3 is a detailed view of a BWR inlet mixer clamp assembly 20, in accordance with example embodiments. The inlet mixer clamp assembly 20 may include an inlet mixer clamp plate 22. The inlet mixer clamp assembly may include inlet mixer jacking bolts 24 that provide a downward clamping force that is applied to the top of the inlet mixer 2. The jacking bolts 24 may be threaded bolts that mate with eyelets of the clamp plate 22 as well as threaded connections that may be made in the top surface of the existing inlet mixer 2 (shown in detail in FIGS. 5 and 6). The jacking bolts may alternatively penetrate clamp plate 22 and contact and/or press on the top surface of the existing inlet mixer 2 without actually penetrating the top surface of the inlet mixer. The inlet jacking bolts 24 may be lined up in a row along the centerline of the clamp plate 22, as shown in FIG. 3. Alternatively, jacking bolts 24 may be provided on other convenient locations on the clamp plate 22. The number of jacking bolts 24 may vary, although four jacking bolts 24 are shown in example embodiments.

Figure 5:
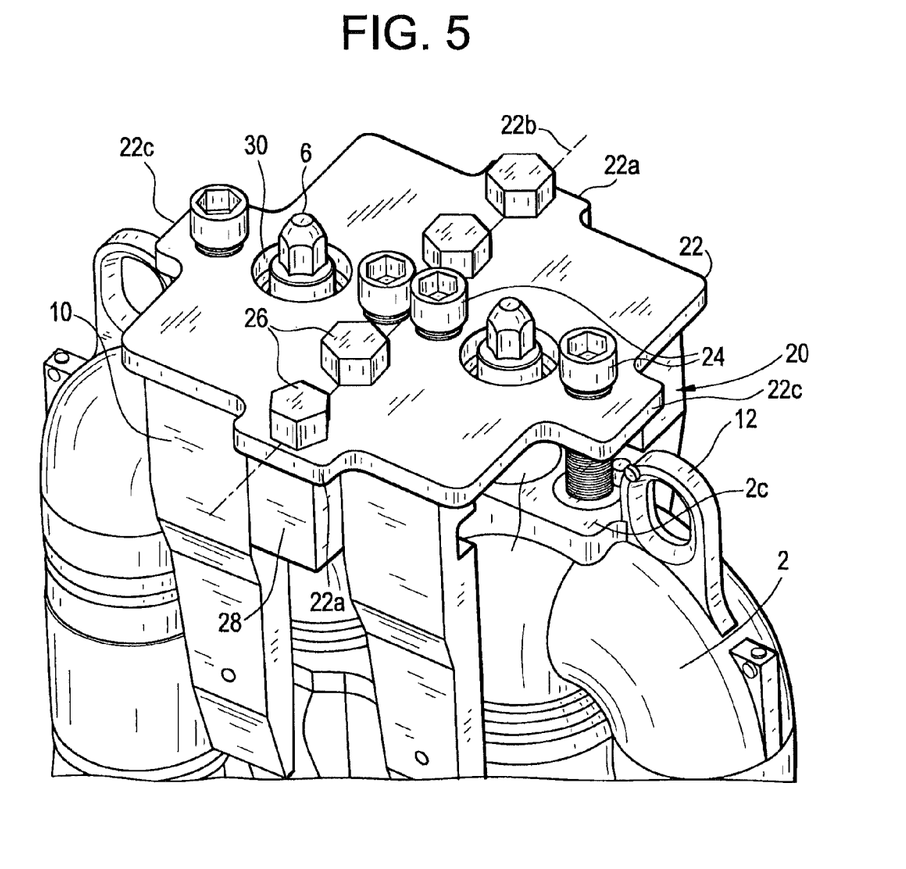
FIG. 5 is a detailed view of a BWR inlet mixer clamp assembly in use in conjunction with conventional jet pump beam assemblies, in accordance with example embodiments.

The clamp plate 22 may include beam bolt holes 30, especially in the case where the clamp assembly 20 is to be used in conjunction with the conventional beam assemblies 8. The beam bolt holes 30 allow for clearance of the beams bolts 6 (as shown in FIG. 5).

The clamp plate 22 may include mounting blocks 28, that may be "C"-shaped components affixed to a bottom surface of the clamp plate 22. Mounting blocks 28 may be securely attached to clamp plate 22 via mounting block bolts 26. Alternative to mounting block bolts 26, other reasonable means of securing mounting blocks 28 to clamp plate 22 may be used, including welding.

All clamp assembly components may be made by materials that are known to be acceptable for a nuclear environment. For instance, stainless steel (304, 316, XM-19, or equivalent) or nickel based alloys (Iconel, X-750, X-718, or equivalent) may be used.

Figure 4:
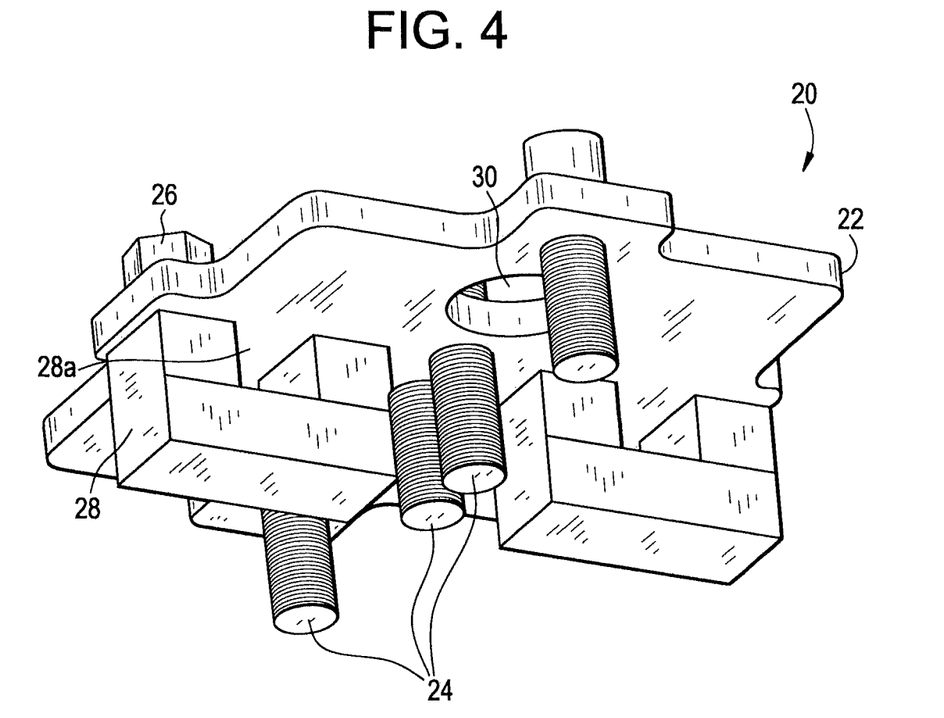
FIG. 4 is a detailed bottom view of a BWR inlet mixer clamp assembly, in accordance with example embodiments.

FIG. 4 is a detailed bottom view of a BWR inlet mixer clamp assembly 20, in accordance with example embodiments. Note that mounting blocks 28, formed in a "C"-shape, include mounting block apertures 28a that cradle the transition piece bridge 10a (shown in FIG. 2). The mounting blocks 28 grip the transition piece 10 to provide an anchor for the clamp plate 22, thereby allowing jacking bolts 24 to then press forcefully down on the top of inlet mixer 2.

FIG. 5 is a detailed view of a BWR inlet mixer clamp assembly 20 in use in conjunction with conventional jet pump beam assemblies 8, in accordance with example embodiments. Note that jacking bolts 24 may mate with threaded connections that are drilled into portions of the thick upper surface 2c of the inlet mixer 2. Mounting blocks 28 are shown cradling the bridge 10a (see FIG. 2) of the transition piece 10, to stabilize the clamp plate 22. Existing beam bolts 6 of the conventional jet pump beam assemblies 8 are shown protruding through the beam bolt holes 30, as the beam bolt holes 30 may be sized to allow the beam bolts 6 to clear the clamp plate 22 when the clamp assembly 20 is attached to the inlet mixer 2. In this example embodiment, conventional jet pump beam assemblies 8 are working in unison with the clamp assembly 20 to provide redundant downward force on the top of the inlet mixer.

The clamp plate 22 is sized to fit between the lifting eyelets 12 of the inlet mixers 2, but may alternatively extend beyond the lifting eyelets. The clamp plate has also been sized to fit over and cover the upper surfaces of opposing portions of transition piece 10 (note that only one side of transition piece 10 is shown in FIG. 5, as the opposing side of transition piece 10 is obscured from the drawing and located on the other side of the inlet mixer 2 as shown in FIG. 2). Lobes 22b are sized to extend from the clamping plate 22 at locations directly above the transition piece bridges 10a (bridges 10a may be seen in FIG. 2). The lobes 22a are located at this position of the clamping plate 22 to support mounting blocks 28 underneath the clamp plate 22 and allow the mounting blocks 28 to cradle the transition piece bridges 10a.

By positioning the jacking bolts 24 at locations on either side of "centerline" 22b of plate 22, the clamp assembly 20 restrains the inlet mixer 2 from rotation during jet pump assembly operation. Note that the "centerline" 22b divides the clamp plate 22 approximately in half, and runs through the center of each lobe 22a (and, centerline 22b also runs directly through the middle and above both transition piece bridges 10a). For the jacking bolts 24 to be effective in mitigating rotation of the inlet mixer 2, it is preferable to have at least one jacking bolt 24 on either side of centerline 22b. Furthermore, the farther the jacking bolts 24 are located away from centerline 22b, the more effective the clamp assembly 20 will be at mitigating clockwise/counterclockwise rotation of the inlet mixers 2. For this reason, lobes 22c may be used to extend the location of jacking bolts 24 away from centerline 22b to provide added leverage to allow clamp assembly 20 to mitigate inlet mixer 2 rotation that may occur especially during jet pump assembly operation. In one embodiment, the jacking bolts 24 may be located on the clamp plate 22 in a line that runs approximately perpendicular to the centerline 22b. Alternatively, if jet pump beam bolts 6 are to be removed from operation upon the installation of clamp assembly, jacking bolts 24 may be located where jet beam bolts 6 would otherwise penetrate plate 22 (i.e., jacking bolts 24 may be located where beam bolt holes 30 may otherwise be located). Alternatively, only one jacking bolt 24 may be located on clamp plate 22 at a location that intersects centerline 22b.

Figure 6:
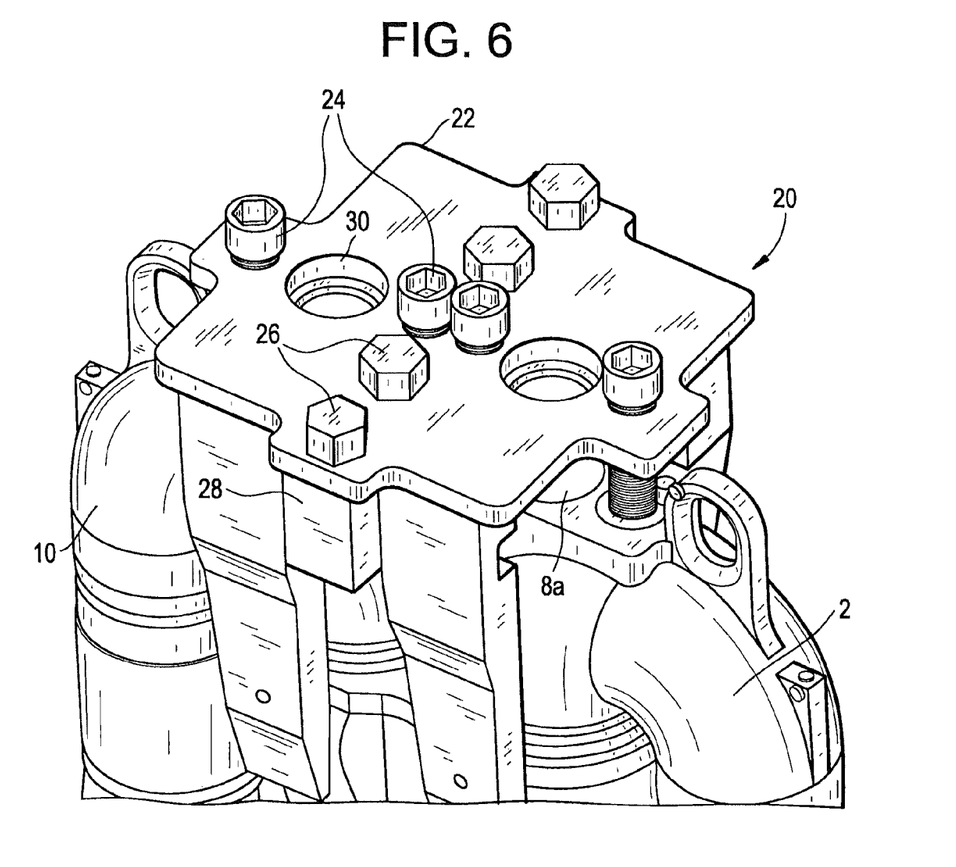
FIG. 6 is a detailed view of a BWR inlet mixer clamp assembly in use (without conventional jet pump beam assemblies), in accordance with example embodiments.

FIG. 6 is a detailed view of a BWR inlet mixer clamp assembly 20 in use (without conventional jet pump beam assemblies 8), in accordance with example embodiments. Note the vacant space 8a that is left under the clamp plate 22, where the conventional jet pump beam assemblies 8 would otherwise be located. Also note that the beam bolt holes 30 do not have beam bolts 6 of the jet pump beam assemblies 8 penetrating through the holes 30. Therefore, the beam bolt holes 30 are optional in this configuration.

The configuration of FIG. 6 allows the clamp assembly 20 to be used in lieu of the conventional jet pump beam assemblies 8, such that the jet pump beam assemblies 8 may be removed prior to installation of the clamp assembly 20.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of installing an inlet mixer clamp assembly on a transition piece of a Boiling Water Reactor (BWR) jet pump assembly, the method comprising:
    forming a clamp plate, the clamp plate being formed to fit between lifting eyelets of the inlet mixer and cover upper surfaces of the transition piece,
    attaching the clamp plate to the transition piece by mounting a pair of mounting blocks onto a bottom surface of the clamp plate, each mounting block forming an aperture that is configured to allow the mounting block to cradle a bridge of the transition piece,
    attaching a jacking bolt to the clamp plate by penetrating the jacking bolt through the clamp plate and having the jacking bolt contact a top surface of the inlet mixer, and
    applying a force to the top surface of the inlet mixer by tightening the jacking bolt.

2. The method of claim 1, further comprising:
    forming two beam bolt holes in the clamp plate, the beam bolt holes being configured to allow a pair of beam bolts of the inlet mixer to protrude through the clamp plate when the clamp plate is attached to the transition piece.

3. The method of claim 1, further comprising:
    forming first and second opposing lobes on the clamp plate, the first and second lobes being configured to extend away from the clamp plate at locations directly above the bridges of the transition piece when the clamp assembly is attached to the transition piece.

4. The method of claim 3, wherein the forming of the clamp plate includes bisecting the clamp plate into approximately two halves with a centerline, the centerline running through the middle of the first and second lobes, wherein the attaching of the jacking bolt includes penetrating at least one jacking bolt through the clamp plate on either side of the centerline.

5. The method of claim 4, further comprising:
    forming third and fourth opposing lobes on the clamp plate, the third and fourth lobes being configured to extend away from the centerline of the clamp plate, wherein the at least one jacking bolt on either side of the centerline penetrates the third and fourth lobes, respectively.

6. The method of claim 3, further comprising:
    attaching each mounting block to the first and second lobes, respectively.

\* \* \* \* \*